United States Patent
Knobloch et al.

[19]

[11] Patent Number: 6,147,459

[45] Date of Patent: Nov. 14, 2000

[54] VOLTAGE-CONTROLLED BALLAST FOR GAS-DISCHARGE LAMPS

[75] Inventors: Gert Knobloch, Plüderhausen; Peter Haaf, Schorndorf, both of Germany

[73] Assignee: Vossloh-Schwabe Elektronik GmbH, Urbach, Germany

[21] Appl. No.: 09/110,414

[22] Filed: Jul. 6, 1998

[30] Foreign Application Priority Data

Jul. 5, 1997 [DE] Germany .......................... 197 28 847

[51] Int. Cl.$^7$ ................................................. H05B 37/02
[52] U.S. Cl. ..................... 315/227 R; 315/223; 315/224; 315/307
[58] Field of Search ................................. 315/224, 219, 315/227 R, 223, 291, 307

[56] References Cited

U.S. PATENT DOCUMENTS

| | | | |
|---|---|---|---|
| 4,631,449 | 12/1986 | Peters | 315/205 |
| 5,449,981 | 9/1995 | Auld et al. | 315/308 |
| 5,563,777 | 10/1996 | Miki et al. | 363/37 |
| 5,914,572 | 6/1999 | Qian et al. | 315/307 |

FOREIGN PATENT DOCUMENTS

| | | |
|---|---|---|
| 3243316 | 6/1983 | Germany . |
| 2163014 | 2/1986 | United Kingdom . |
| WO 90/11004 | 9/1990 | WIPO . |

*Primary Examiner*—David Vu
*Attorney, Agent, or Firm*—Foley & Lardner

[57] ABSTRACT

An electronic, externally controlled ballast has a control oscillator which feeds a fluorescent lamp via an invertor bridge and a resonant circuit. To keep the voltage constant, there are derived from the lamp AC voltage charge packets whose size (and/or phase angle) characterizes the size of the lamp AC voltage. The charge packets are conducted onto a frequency-determining capacitor of the oscillator, which is designed as a sweep oscillator, voltage control thereby being achieved. The ballast provides for reliable operation of gas-discharge lamps. Its design is robust and yet simple, avoids undesired hunting and delivers a good degree of voltage stability.

21 Claims, 2 Drawing Sheets

VOLTAGE-CONTROLLED BALLAST FOR GAS-DISCHARGE LAMPS

FIELD OF THE INVENTION

The invention relates to a ballast for gas-discharge lamps, which is suitable for fluorescent lamps, in particular. This is an externally controlled ballast in which the operating frequency of the gas-discharge lamp is prescribed by an oscillator circuit.

BACKGROUND OF THE INVENTION

In the case of gas-discharge lamps, it is frequently desired, and in the case of modern gas-discharge lamps mostly mandatory, for the power converted by the gas-discharge lamp to be controlled. Should this not take place, the gas-discharge lamp can be overloaded, as a result of which its service life is shortened or, in the worst case, an immediate defect occurs.

EP 0605052 A1 discloses an electronic ballast for fluorescent lamps which contains a monitoring circuit for the lamp current. In order to generate the lamp AC voltage, use is made of an invertor bridge which is controlled by a voltage-controlled oscillator (VCO). A series resonant circuit is connected to the output of the invertor bridge in order to feed the fluorescent lamp. Via a shunt, a current signal which is fed as voltage to a filter circuit is tapped at the frame-side base point of the gas-discharge lamp. The DC voltage present at the filter output characterizes the current flowing through the fluorescent lamp. The VCO is controlled by said voltage. The VCO and the series resonant circuit connected to the invertor bridge are dimensioned such that the VCO can operate both at the resonant frequency of the series resonant circuit and at higher frequencies. With increasing lamp current and, in particular, when the lamp current becomes too high, the VCO increases its frequency and thereby leads the series resonant circuit out of resonant operation.

The filter circuit required for filtering the current signal is tuned to the frequency response of the fluorescent lamp, in particular with regard to its zeroing. This can lead to problems when various types of lamps are to be used. Also, the filter to be implemented is enough in itself to require a relatively large number of components. Moreover, a certain reaction time can become noticeable in the case of discontinuous transition operations.

SUMMARY OF THE INVENTION

Accordingly, it is an object of the present invention to provide a ballast for use with a gas-discharge lamp, in particular a fluorescent lamp, which permits reliable operation without using a relatively large number of components.

Described herein is an electronic ballast for a gas-discharge lamp, where the ballast includes a control oscillator, such as a flip-flop, for generating a control signal to control the frequency of an AC voltage supplied to the gas-discharge lamp. The ballast also includes an invertor, connected to the control oscillator, for converting a provided DC voltage to the AC voltage supplied to the gas-discharge lamp with a frequency determined by the control signal from the control oscillator. The ballast further includes a charge packet injector, connected to the control oscillator, for injecting charge packets to the control oscillator to affect the control signal and thereby affect the frequency of said AC voltage supplied to the gas-discharge lamp. Use of the charge packet injector, as described herein, allows the control oscillator, and thus, the AC power supply to the gas-discharge lamp, to be controlled more quickly and accurately than is possible with VCO circuits.

Instead of the known VCO, in the ballast according to the invention use is made of the control oscillator whose frequency is varied by pulsed and inphase feeding of charge packets to the oscillator circuit. In this process, the size of the charge packets determines the size of the frequency variation occurring. This yields a design having an extremely short reaction time. If the lamp voltage overshoots the prescribed maximum value, for example only for one oscillation period, the charge injector circuit immediately transfers a charge packet to the oscillator circuit, which immediately executes a change in frequency. In this way, the control of the oscillator circuit is performed measure by measure, that is to say period by period and not integrally over several periods, as is the case with VCO circuits, which use a filtered control voltage.

The immediate reaction of the oscillator circuit is rendered possible by virtue of the fact that the desired current, voltage or power control is performed individually or by period. It is possible in this case to monitor the voltage, for example, at the gas-discharge lamp and to keep said voltage constant. For this purpose, the charge injector circuit is connected to a circuit point at which there is present the lamp voltage or another voltage which characterizes the lamp voltage. Alternatively, the charge injector circuit can be connected to a current sensor (shunt or current transformer) or to a power sensor.

The ballast according to the invention can include the charge injector circuit as a safety circuit, for example only for limiting the lamp voltage. In this case, the lamp voltage is more or less uncontrolled and the effect of the lamp injector circuit is merely to prevent the lamp voltage from overshooting a limiting value. However, an embodiment is preferred in which the lamp voltage is controlled to a value as constant as possible by the charge injector circuit acting on the oscillator circuit. This renders it possible to operate different gas-discharge lamps reliably with one and the same ballast.

In addition to controlling the lamp voltage and/or the lamp current by means of the charge injector circuit, the ballast can have an additional control device or controller which influences the oscillator frequency in another way. For example, it is possible to connect in series (or in parallel) with the frequency-determining capacitor a further capacitor with which a switch or a variable resistor (transistor) is connected in parallel (or in series). It is thereby possible for the frequency of the oscillator circuit to be varied as desired both by individual pulses by injecting charge packets and integrally by an appropriate control voltage, as a result of which the operation of the invertor circuit, and thus also the operation of the series resonant circuit are fixed.

The oscillator circuit is preferably a flip-flop, for example an astable multivibrator with a single RC combination as frequency-determining element. The resistor of the RC combination forms here a recharging path for charging and discharging the capacitor, whose charge and voltage thereby increase and decrease in time with the oscillation of the oscillator. While the capacitor is being charged, the flip-flop assumes its first state, and assumes its second state when the capacitor is discharged. If, for example, an additional charge packet is applied to the capacitor during its discharging phase in each case, the discharge time is lengthened, and the oscillator frequency decreases overall. By contrast, if the additional charge packet is applied to the capacitor during the charging phase, the capacitor is more quickly charged than it would be solely via the recharging path, and the oscillator frequency therefore increases. If a negative charge packet is applied during the charging phase, the charging is slowed down and the frequency decreases.

If the phase angle of the additionally injected charge packets is fixed with respect to the oscillator frequency, the frequency of the oscillator circuit can be controlled solely via the size of the additional charge packets. Charge packets of prescribed polarity (for example positive) are preferably applied always only during the charging phase or the discharging phase, but not during both phases. The same holds for charge packets of different polarity.

The injector current path is preferably of purely resistive design. It therefore includes neither inductive components nor capacitors which would define a filter characteristic. This renders possible a simple design with few components and a reaction of the oscillator circuit uninfluenced by filter curves. It is thereby possible to achieve voltage control which is precise and quick.

The injector current path includes both a comparator circuit, which compares the lamp AC voltage with a desired value, for example, and a switch which opens briefly when the instantaneous value of the lamp AC voltage is greater than the prescribed desired or limiting value. The two functions can be united in a suitable two-terminal element with appropriate characteristics, for example a Z diode. The latter conducts, for example, only if the lamp AC voltage overshoots a threshold value, it being the case then that a flow of current is then permitted during the corresponding half wave of the lamp AC voltage for as long as the instantaneous value of the lamp AC voltage is greater than the threshold value. The size of the current flowing, and thus the size of the charge packet can be influenced by resistors which are connected in series with the Z diode. The higher the lamp voltage, the larger also is the charge packet passed by the Z diode, and the oscillator frequency is correspondingly changed. If the circuit is to operate not as a voltage limiter but as a voltage controller, it is expedient for the Z voltage of the Z diode to be dimensioned such that said diode also conducts when the lamp voltage has its desired value. The controller is thus in its active range. If the lamp voltage rises somewhat, the current (the charge packets) passed by the series resistors rises (become larger), and this counteracts the increase in voltage via the reduction in the oscillator frequency. A converse statement holds for lowering of the lamp voltage.

In addition, or as an alternative, the lamp voltage and/or the lamp current can be controlled by changing the phase angle of the charge packets passed by the injector circuit with respect to the oscillator frequency. Charge packets which, viewed in terms of time for example, are fed symmetrically relative to the changeover points in the flip-flop cause a slight variation in the pulse duty factor of the oscillator output voltage and, in addition, in the frequency. The control performed by the injector circuit is therefore relatively insensitive to small phase variations. This effect prevents errors when the injector circuit is connected to a series resonant circuit which causes a phase rotation as soon as it must operate with detuning.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF PREFERRED EMBODIMENTS

As described herein with reference to the accompanying drawings, the present invention provides a ballast for use with a gas-discharge lamp, in particular a fluorescent lamp, which permits reliable operation without using a relatively large number of components.

Figure 1:
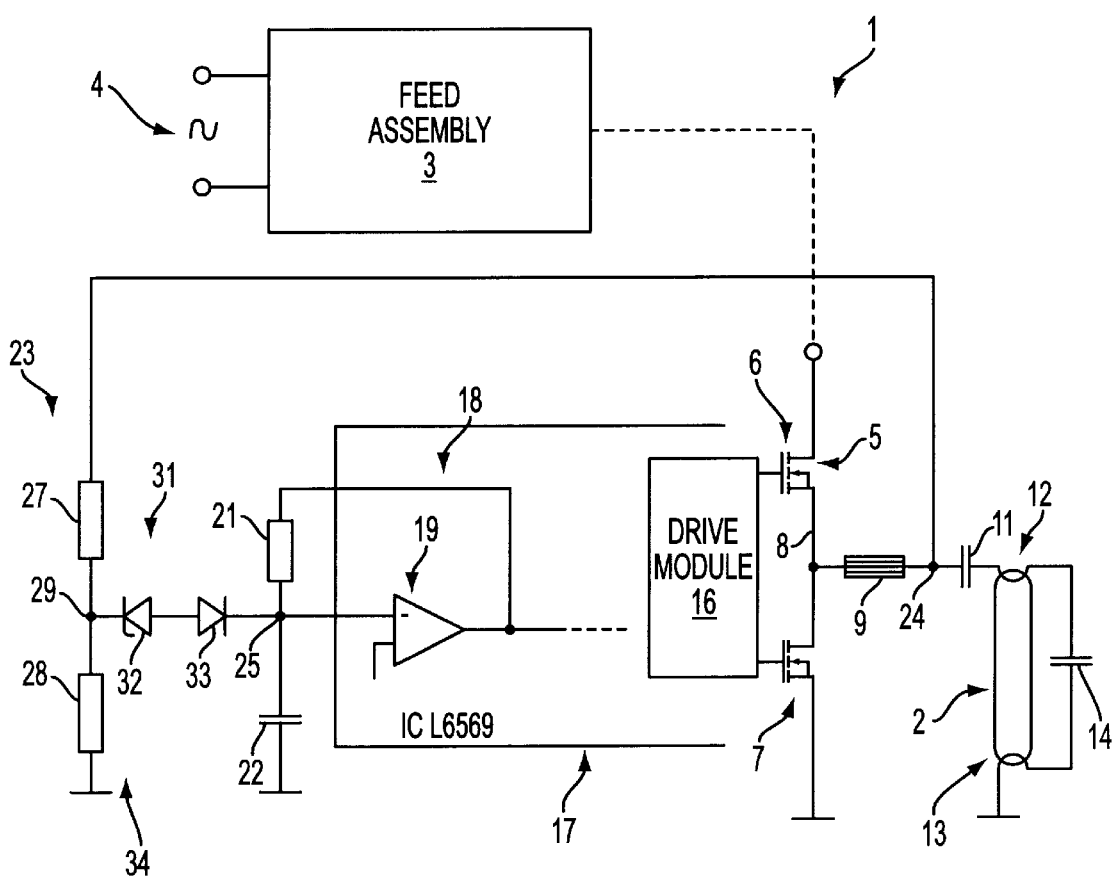
FIG. 1 is a partial block diagram illustrating a ballast according to the present invention.

Illustrated partially in FIG. 1 is a ballast 1 for a fluorescent lamp 2 which is fed by the ballast 1. The ballast 1 receives the DC voltage it requires for operation at a level of several 100 volts (for example 410 volts) from an upstream feed assembly 3 which is fed with an AC supply voltage 4. The feed assembly 3 is formed, for example, by a rectifier with a downstream step-up controller. The feed assembly 3 serves to supply an invertor 5 which is formed by two switching transistors (MOSFETS) 6, 7 connected to one another in series. The drain-source connection 8 of the two switching transistors 6, 7 leads via a coil component 9 and a coupling capacitor 11 to a first electrode 12 of the fluorescent lamp 2 whose other electrode 13 is connected to frame. The electrodes 12, 13 are designed as incandescent filaments and connected to one another in parallel with the fluorescent lamp 2 via a capacitor 14. The coil component 9 and the capacitor 14 form a series resonant circuit between the drain-source connection 8 and frame.

The invertor 5 is connected to a drive module 16 which drives the two gate electrodes (gates) of the two switching transistors 6, 7. The drive module 16 can be part of an integrated circuit 17 in which there is also preferably integrated a control oscillator 18. The control oscillator 18 thereby stipulates the frequency at which the DC voltage present at the invertor 5 is converted into a square-wave AC voltage.

The control oscillator 18 is designed as a sweep oscillator, and has an amplifying and inverting signal path 19. The feedback is performed by an ohmic resistor 21 which is part of the external circuitry of the integrated circuit 17. The resistor 21 leading from the output to the input of the signal path 19 forms a recharging path for a capacitor 22 which is connected to frame from the input of the signal path 19. The capacitor 22 is charged and discharged via the resistor 21 when the control oscillator 18 oscillates. The resistor 21 and capacitor 22 in this case fix the oscillation frequency of the control oscillator 18.

In order to control the voltage present at the fluorescent lamp 2, use is made of a charge injector circuit 23 whose input is connected to the connecting point 24 between the coil component 9 and the coupling capacitor 11 and whose output is connected to the connecting point 25 between the resistor 21 and the capacitor 22. The charge injector circuit 23 is formed by a voltage divider formed from two resistors 27, 28 whose connecting point 29 is connected via a current path to the connecting point 25, the current path including a comparator circuit 31 formed from a Z diode 32 and a diode 33 connected in series with the latter. For the purpose of increasing the voltage endurance, the resistor 27 can be formed by a series circuit of several individual resistors.

The ballast 1 thus far described operates as follows:

The control oscillator 18 is set such that when operating without an influence, that is to say when the charge injector circuit 23 is passive and, starting from the connecting point 29, there are no charge packets passed to the connecting point 25, it operates at a frequency which corresponds approximately to the resonant frequency of the series resonant circuit formed from the coil component 9 and the capacitor 14. Said series resonant circuit thus has a maximum voltage rise at the connecting point 24 at which the electrode 12 of the fluorescent lamp 2 is connected via the coupling capacitor 11. Said voltage is higher than the maximum permissible operating voltage for the fluorescent lamp 2.

During controlled operation of the ballast 1, said voltage is lowered by reducing the frequency of the control oscillator 18 to the desired value. The frequency of the control oscillator 18 and thus of the AC voltage output by the invertor 5 is lowered until the resonance rise at the connecting point 24 reaches the desired value for the lamp voltage 2. The latter voltage is reached by the charge injector circuit 23. The voltage divider of the latter (resistors 27, 28) generates at the connecting point 29 an AC voltage between zero volts and a maximum value in the range of a few tens of volts. As soon as the voltage nears its maximum value, the Z voltage of the Z diode 32 is reached, and a flow of current occurs to the connecting point 25, which lasts until the voltage at the connecting point 29, reduced by the Z voltage of the Z diode 32 and the forward voltage of the diode 33 is higher than the voltage at the connecting point 25.

A charge packet is pushed onto the capacitor 22 during the flow time. This is performed, for example, during the discharging phase of the capacitor 22, that is to say during the phase of its oscillation period in which it is discharged via the resistor 21. The discharging operation is now delayed, because it is necessary to discharge via the resistor 21 not only the charge stored in any case on the capacitor 22, but additionally the charge (charge packet) applied via the Z diode 32 and the diode 33. Said operation reoccurs in each oscillation period, as a result of which the oscillation frequency of the control oscillator 19 decreases.

The decrease in frequency, that is to say the extension of the discharging time phases of the capacitor 22 corresponds to the size of the charge packet applied in each discharging phase by the charge injector circuit 23. The size of the charge packet is a function of the magnitude of the peak voltage present at the connecting point 29, and thus of the voltage detected at the connecting point 24. If the voltage rises above the desired value, the frequency is reduced by charge packets, which are growing larger, applied to the capacitor 22. A larger spacing from the resonant frequency of the series resonant circuit (coil component 9, capacitor 14) is reached by reducing the frequency, as a result of which the resonance rise, and thus the lamp voltage, decreases until the desired value is reached.

Conversely, too small a lamp voltage leads to a reduction in the voltage at the connecting point 29, and thus to a reduction in the charge packets additionally applied to the capacitor 22. Consequently, the frequency of the oscillator 18 can rise, the frequency of the invertor 5 being brought nearer to the resonance point, as a result. The lamp voltage therefore increases until the desired value is reached. A constant stabilization of the lamp voltage is realized thereby in the simplest way and virtually without a settling time. The lamp voltage is controlled and set virtually period by period, that is to say separately in each oscillation period. It is thereby possible to achieve a very precise and quick voltage control.

By suitable dimensioning, the circuit illustrated in FIG. 1 can also be used solely for voltage limitation instead of for voltage control. This is achieved when the charge injector circuit 23 becomes active only if a limiting voltage is overshot at the connecting point 24. If the voltage at said connecting point is in a range therebelow, no charge packets are applied to the capacitor 22, and the control oscillator 18 runs without being influenced by the charge injector circuit 23. The Z diode 32 enters breakdown operation and reduces the frequency of the control oscillator 18 only when the limiting voltage is overshot at the connecting point 24.

Figure 2:
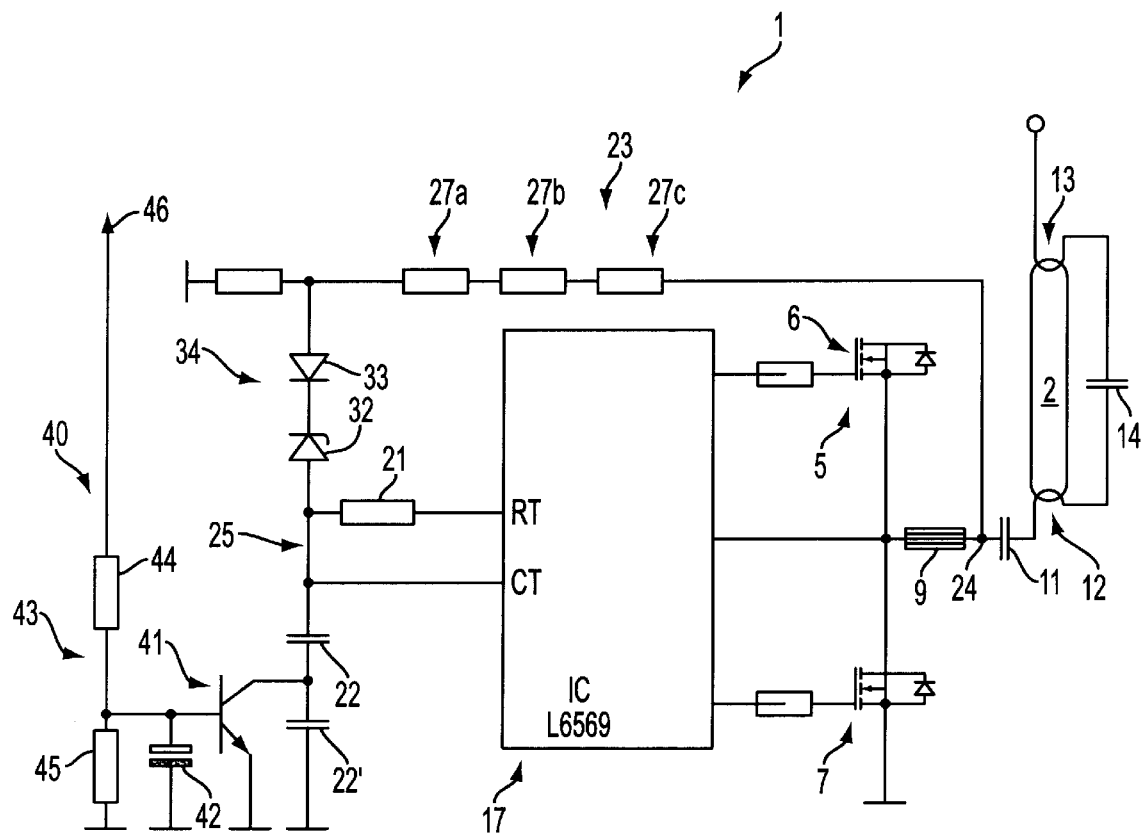
FIG. 2 is a block diagram illustrating a ballast according to the invention with additional conventional frequency influencing.

A modified embodiment of the ballast 1 may be seen in FIG. 2. Once again, the fluorescent lamp 2 is connected to a resonant circuit formed from the coil component 9 and the capacitor 14. The coupling capacitor 11 serves to suppress direct components in the lamp current. The invertor 6 is driven by the integrated circuit 17, which is formed by the commercially available component L6569. The inputs of the control oscillator are RT and CT, which are connected to an RC combination comprising the resistor 21 and the capacitors 22, 22'. Otherwise than for the charge injector circuit 23 previously described, as upper voltage divider resistance the charge injector circuit 23 used here has series resistors 27a, 27b, 27c which lead from the connecting point 24 to the comparator circuit 34. The latter is formed from the diode 33 and the Z diode 32, which are connected in an anti-parallel fashion in series. The Z diode 32 is connected with its cathode to the connecting point 25.

In addition to the control circuit formed by the charge injector circuit 23, the ballast 1 according to FIG. 2 includes a further control intervention 40. The frequency-determining RC combination of the control oscillator includes the capacitors 22, 22' connected to one another in series. The capacitor 22' connected to the frame can be bridged by a controllable switch, for example a transistor 41, which is arranged here with the collector path in parallel with the capacitor 22'. The base of the transistor is connected to the frame with a buffer capacitor 42, with the result that AC voltages are kept away from the base. The potential of the base is fixed via a voltage divider 43, to which the resistors 44, 45 belong. The input 46 of the voltage divider forms a control input. When the input is made positive to such an extent that the transistor 41 switches through, the capacitor 22' is bridged, as a result of which the frequency-determining capacitance of the RC combination increases. The result is that the oscillating frequency drops.

Independently thereof, the frequency is influenced by the charge injector circuit 23, which with increasing voltage at the connecting point 24 pushes larger charge packets in phase onto the capacitor 22, with the result that the discharging time thereof is lengthened. The oscillation frequency therefore decreases, and the spacing of the operating frequency from the resonant frequency increases, as a result of which the lamp voltage drops again to its desired value. Conversely, the operating frequency increases when the voltage at the connecting point 24 drops below the desired value and small charge packets, or none at all, are pushed onto the capacitor 22.

Figure 3:
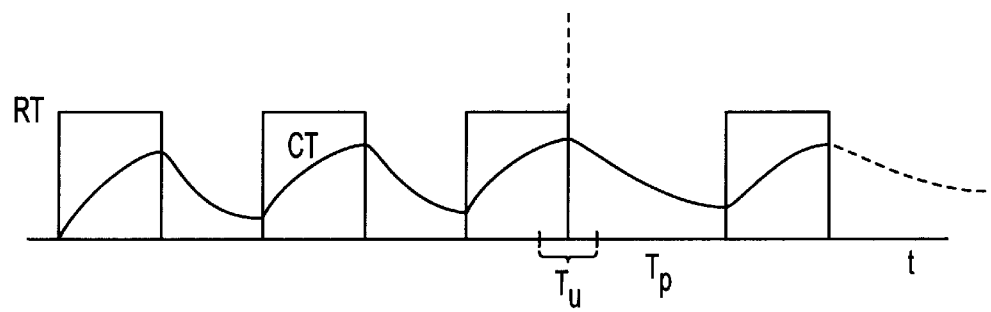
FIG. 3 shows the principle of the temporal characteristic in selected voltages of the circuit shown in FIG. 2.

The relationships are illustrated in FIG. 3. RT denotes the square-wave output voltage by means of which the control oscillator operates. CT is the voltage present at the capacitor 22. The voltage characteristic for the case of an inactive charge injector circuit is represented on the left in FIG. 3, next to the dashed line. It is shown to the right of the separating line how the discharging of the capacitor 22 is delayed when additional charge is supplied to the capacitor 22 via the charge injection circuit 23 during the discharging operation.

The charge injector circuit 23 can also be used to increase the frequency of the control oscillator when the aim is to effect a distancing from the resonant frequency with the increase. It is then connected to a circuit point operating with a phase offset of 180°, with the result that the charging time of the capacitor 22 is reduced by applying additional charge packets.

In an alternative embodiment, the phase angle of the application of the charge packets to the capacitor 22 is also changed. If, in the case of the embodiment according to FIGS. 1 and 2, the charge packet is given to the capacitor 22 during the pause TP (FIG. 3), it is additionally possible to use the phase angle for control. If a charge packet is applied, for example symmetrically relative to the changeover instant during a time TU, said charge packet effects a shortening of the charging phase and a lengthening of the discharging phase, as a result of which at most a very slight change in frequency is achieved overall. If the charge packet is now applied earlier, the charging time is shortened and the frequency increases. If it is applied later, the discharging time is lengthened and the frequency decreases. The phase angle can be used in this way for frequency control.

An electronic externally controlled ballast 1 has a control oscillator 18 which feeds a fluorescent lamp 2 via an invertor bridge 5 and a resonant circuit. To keep the voltage constant, there are derived from the lamp AC voltage charge packets whose size (and/or phase angle) characterizes the size of the lamp AC voltage. The charge packets are conducted onto a frequency-determining capacitor 22 of the oscillator 18, which is designed as a sweep oscillator, voltage control thereby being achieved. The latter is robust and simple, avoids undesired hunting and delivers a good degree of voltage stability.

A foreign priority document, application number 197 28 847.2 in the Federal Republic of Germany dated Jul. 5, 1997, is herein incorporated by reference.

It is intended that the invention, as described herein, include all variations and modifications as fall within the scope of the claims and equivalents thereof.

What is claimed is:

1. A ballast for a gas-discharge lamp comprising:
   a frequency-determining oscillator circuit comprising a capacitor whose charge increases and decreases in an alternating fashion between a maximum value and a minimum value in time with the oscillation frequency of the oscillator circuit;
   an invertor circuit which converts a provided DC voltage at the frequency prescribed by the oscillator circuit into an AC voltage which is present at its output and to which a series resonant circuit for feeding the gas-discharge lamp is connected; and
   a charge injector circuit which has an injector current path from the gas-discharge lamp to the capacitor over which charge packets are conducted onto the capacitor at a frequency synchronized with the capacitor AC voltage, the size and/or phase angle of which packets are/is a function of the voltage present at the gas-discharge lamp and/or the current flowing through it;
   wherein the capacitor is connected to a recharging path over which the capacitor is charged or discharged while the oscillator circuit is in its respective astable state and wherein said recharging path is a resistive current path with a positive feedback characteristic.

2. The ballast as claimed in claim 1, wherein the oscillator circuit includes a flip-flop.

3. The ballast as claimed in claim 2, wherein the oscillator circuit has two astable states, and wherein it respectively changes state when the charge of the capacitor reaches its maximum value or its minimum value.

4. The ballast as claimed in claim 3, wherein the oscillator circuit includes a comparator circuit which detects the voltage present at the capacitor, with the result that the dwell time of the oscillator circuit in its respective dwell state is determined by the size of the charge to be applied to or removed from the capacitor via the recharging path.

5. The ballast as claimed in claim 1, wherein the injector current path for the oscillation frequency of the oscillator circuit is designed to be purely resistive.

6. The ballast as claimed in claim 5, said injector current path comprising at least one element with a nonlinear characteristic.

7. The ballast as claimed in claim 6, wherein the injector current path has a characteristic which is asymmetric with respect to the zero point.

8. The ballast as claimed in claim 6, said injector current path comprising at least one Z diode.

9. The ballast as claimed in claim 6, said injector current path comprising at least one diode.

10. The ballast as claimed in claim 1, wherein the injector current path includes a comparator circuit which renders the injector current path conductive at least briefly when the instantaneous value of the lamp AC voltage overshoots a preset limiting value.

11. The ballast as claimed in claim 1, wherein the resonant frequency of the series resonant circuit is fixed in such a way that with increasing size of the charge packets passed by the injector current path, the conversion frequency of the invertor departs from the resonant frequency of the series resonant circuit.

12. The ballast as claimed in claim 11, wherein the injector current path is designed and dimensioned in such a way that no charge packets are passed when the voltage present at the gas-discharge lamp is lower than a predetermined limiting value, and wherein when the lamp voltage overshoots the limiting value charge packets are passed whose size increases with increasing lamp voltage.

13. The ballast as claimed in claim 12, wherein the increase in the size of the charge packets is more than linearly proportional to the increase in size of the lamp voltage.

14. The ballast as claimed in claim 11, wherein the injector current path is designed and dimensioned in such a way that smaller charge packets are passed when the voltage present at the gas-discharge lamp deviates in a first direction from a predetermined desired value, and wherein the size of the charge packets increases when the lamp voltage deviates in another direction from the desired value.

15. An electronic ballast for a gas-discharge lamp, said ballast comprising:
   a control oscillator for generating a control signal to control the frequency of an AC voltage supplied to said gas-discharge lamp;
   an invertor, connected to said control oscillator, for converting a provided DC voltage to said AC voltage with a frequency determined by said control signal;

a charge packet injector, connected to said control oscillator, for injecting charge packets to said control oscillator to affect said control signal and thereby affect the frequency of said AC voltage supplied to said gas-discharge lamp;

wherein the control oscillator includes a capacitor that is connected to a recharging path over which the capacitor is charged or discharged while the control oscillator is in its respective astable state and wherein said recharging path is a resistive current path with a positive feedback characteristic.

16. An electronic ballast for a gas-discharge lamp as recited in claim 15 wherein the control oscillator comprises a flip-flop.

17. An electronic ballast for a gas-discharge lamp as recited in claim 15 wherein the voltage of said charge packets injected by said charge packet injector creates a frequency variation in-said control signal.

18. An electronic ballast for a gas-discharge lamp as recited in claim 15 wherein the phase of said charge packets injected by said charge packet injector creates a frequency variation in said control signal.

19. An electronic ballast for a gas-discharge lamp as recited in claim 15 further comprising a comparator circuit connected between said charge packet injector and said control oscillator for controlling the flow of said charge packets, said comparator circuit comprising at least one diode and at least one Z diode.

20. An electronic ballast for a gas-discharge lamp as recited in claim 15, said control oscillator further comprising a capacitive circuit wherein said injected charge packets increase or decrease the time required for said capacitive circuit to discharge.

21. An electronic ballast for a gas-discharge lamp as recited in claim 20 wherein the capacitance of said capacitive circuit is variable.

* * * * *